United States Patent
Hwang et al.

(10) Patent No.: US 11,644,600 B2
(45) Date of Patent: May 9, 2023

(54) FLEXIBLE COVER WINDOW

(71) Applicant: UTI INC., Chungcheongnam-do (KR)

(72) Inventors: Jae Young Hwang, Gyeonggi-do (KR); Kukhyun Sunwoo, Gyeonggi-do (KR); Tea Joo Ha, Chungcheongnam-do (KR)

(73) Assignee: UTI INC.

( * ) Notice: Subject to any disclaimer, the term of this patent is extended or adjusted under 35 U.S.C. 154(b) by 0 days.

(21) Appl. No.: 17/580,533

(22) Filed: Jan. 20, 2022

(65) Prior Publication Data
US 2022/0236457 A1   Jul. 28, 2022

(30) Foreign Application Priority Data
Jan. 28, 2021  (KR) .......................... 10-2021-0012012

(51) Int. Cl.
| | | |
|---|---|---|
| *G06F 3/041* | (2006.01) | |
| *G02B 1/14* | (2015.01) | |
| *G02B 5/30* | (2006.01) | |
| *G09F 9/30* | (2006.01) | |
| *G06F 1/16* | (2006.01) | |

(52) U.S. Cl.
CPC ............. *G02B 1/14* (2015.01); *G02B 5/3083* (2013.01); *G06F 1/1616* (2013.01); *G06F 1/1641* (2013.01); *G09F 9/301* (2013.01)

(58) Field of Classification Search
CPC .... G06F 1/1616; G06F 1/1641; G06F 1/1652; G09F 9/301; G02B 1/14; B32B 7/12; B32B 2307/412
See application file for complete search history.

(56) References Cited

U.S. PATENT DOCUMENTS

| | | | | |
|---|---|---|---|---|
| 10,368,452 | B2 * | 7/2019 | Yun ....................... | G06F 1/1681 |
| 2012/0218494 | A1 * | 8/2012 | Nakayama ........ | G02F 1/133608 |
| | | | | 445/24 |
| 2015/0282336 | A1 * | 10/2015 | Jung ...................... | B32B 7/022 |
| | | | | 361/679.01 |
| 2016/0101593 | A1 * | 4/2016 | Nam ...................... | B32B 7/022 |
| | | | | 428/212 |

(Continued)

FOREIGN PATENT DOCUMENTS

| | | |
|---|---|---|
| KR | 10-2019-0134949 A | 12/2019 |
| KR | 10-2020-0030663 A | 3/2020 |

*Primary Examiner* — Joe H Cheng
(74) *Attorney, Agent, or Firm* — Mendelsohn Dunleavy, P.C.

(57) ABSTRACT

Proposed is a flexible cover window including a window substrate and an elastic buffer layer having a single-layer structure or a multi-layer structure. The elastic buffer layer is provided on the rear surface of the window substrate to absorb deformation occurring in a folding part. The flexible cover window is a glass-based cover window for protecting a flexible display that is foldable, rollable, slidable, or stretchable. In addition, the flexible cover window has an elastic buffer layer on the rear surface of the window substrate to reduce the difference in elongation between the window substrate and a display panel so that delamination or buckling due to micro-deformation at the folding part thereof can be prevented. Therefore, the life span of the flexible cover window is prolonged and distortion of an image on the screen at the folding part can be prevented.

18 Claims, 4 Drawing Sheets

(56) References Cited

U.S. PATENT DOCUMENTS

| | | | |
|---|---|---|---|
| 2016/0190488 A1* | 6/2016 | Yao | H01L 51/56 |
| | | | 438/34 |
| 2019/0101784 A1* | 4/2019 | Shin | G06F 3/045 |
| 2019/0273212 A1* | 9/2019 | Shin | H01L 51/5253 |
| 2019/0355919 A1* | 11/2019 | Lu | B32B 17/06 |
| 2019/0361286 A1* | 11/2019 | Jang | G02F 1/133305 |
| 2020/0081162 A1* | 3/2020 | Park | H01L 51/5253 |
| 2020/0185641 A1* | 6/2020 | Jeong | H01L 51/0097 |
| 2020/0203611 A1* | 6/2020 | Peng | H01L 51/003 |
| 2020/0212327 A1* | 7/2020 | Park | H01L 51/5253 |
| 2020/0251025 A1* | 8/2020 | Li | H01L 51/5237 |
| 2020/0257338 A1* | 8/2020 | Park | G06F 1/1641 |
| 2021/0191467 A1* | 6/2021 | Sunwoo | C03C 15/00 |

* cited by examiner

PRIOR ART

FLEXIBLE COVER WINDOW

CROSS REFERENCE TO RELATED APPLICATION

The present application claims priority to Korean Patent Application No. 10-2021-0012012, filed Jan. 28, 2021, the entire contents of which is incorporated herein for all purposes by this reference.

BACKGROUND OF THE INVENTION

1. Field of the Disclosure

The present disclosure relates to a flexible cover window. More particularly, the present disclosure relates to a flexible cover window having an elastic buffer layer on the rear surface of a substrate thereof to absorb micro-deformation occurring in a folding part, thereby preventing delamination or buckling in the folding part.

2. Description of the Related Art

In recent years, electrical and electronic technologies have been rapidly developing, and various types of display products are emerging to meet the needs of the new era and the needs of various consumers.

In the case of a flexible display, research is being conducted on display capable of bending, rolling, and stretching, starting from folded state. A cover window for protecting the display panel as well as the display panel should be formed to be flexible.

Such a flexible cover window should have good flexibility and should not cause marks on the folding part even when repeatedly being folded, and there should be no distortion of image quality.

For the cover window of the existing flexible display, a polymer film such as PI or PET has been used on the surface of the display panel.

However, in the case of a polymer film, due to its weak mechanical strength, it simply serves to prevent scratches on a display panel, is vulnerable to impact resistance, has low transmittance, and is known to be relatively expensive.

In addition, in the case of such a polymer film, as the number of folds of the display increases, marks are left on the folding part, resulting in damage to the folding part. For example, pressing or tearing of the polymer film occurs during the evaluation of the folding limit (normally 200,000 times).

Recently, in order to overcome the limitations of the cover window of the polymer film, various research on glass-based cover windows has been conducted.

Such a glass-based cover window is required to have physical properties that satisfy folding characteristics, cause no distortion of the screen, and have sufficient strength even in the case of repeated contacts and pressings by touching pens or the like.

Recently, as consumer demand for flexible displays of various folding methods, such as foldable, rollable, slidable, and stretchable methods, increases, research is being actively conducted. Attention is also focused on research on a cover window to protect such display (OLED) panels.

In the case of a polymer film such as CPI or PET or glass as a material of the existing cover window, when folding is repeated, a delamination or buckling phenomenon occurs frequently depending on the difference in elongation at the folding part as shown in FIGS. 1 and 2.

This phenomenon occurs more severely as the cover window is thicker or has higher hardness. Thus the thickness and hardness of the cover window have been limited in selecting the material of the cover window.

That is, when the cover window is relatively thin, deformation is small when bent, and thus the above delamination or buckling phenomenon does not occur much. However, as the thickness of the cover window increases and the hardness increases, deformation increases during folding, making it difficult to apply.

In addition, the delamination or buckling problem is more likely to occur as the number of times of folding increases, regardless of the material of the cover window.

As described above, research is needed on a cover window without distortion of a screen while solving the deformation problem in a folding part and satisfying strength characteristics and folding characteristics for various folding methods of a flexible display.

SUMMARY OF THE INVENTION

An objective of the present disclosure is to provide a flexible cover window that forms an elastic buffer layer on the rear surface of a window substrate to absorb micro-deformation occurring in the folding part so that there is no delamination or buckling in the folding part.

In order to achieve the above objective, a flexible cover window characterized by the technical gist of the present disclosure is to provide a flexible cover window including an elastic buffer layer formed in a single structure or a multi-layer structure on a window substrate and the rear surface of the window substrate to absorb deformation occurring in the folding part.

In addition, when the elastic buffer layer is formed in a single structure, it is preferable that the elastic buffer layer is sequentially formed as an upper adhesive layer, an elastic film layer at a lower part of the upper adhesive layer, and a lower adhesive layer at a lower part of the elastic film layer.

In addition, when the elastic buffer layer is formed in a multi-layer structure, preferably an upper adhesive layer, a plurality of elastic film layers formed in a laminated structure through an intermediate adhesive layer under the upper adhesive layer, and a lower adhesive layer are sequentially formed under the elastic film layer laminated structure.

In addition, the elastic film layer may preferably be any one of an elastic poly urethane (EPU) film, a thermoplastic polyurethane (TPU) film, and a polyolefin (PO) film.

In addition, it is preferable to use optical clear adhesion (OCA) or optical clear resin (OCR) for the upper adhesive layer and the lower adhesive layer.

In addition, the thickness of the elastic film layer is preferably 25 to 150 μm, and the thickness of the upper and lower adhesive layer is preferably 10 to 150 μm.

In addition, the window substrate is preferably a polymer film or glass, and the window substrate has a thickness of 30 to 400 μm, and a CPI film or a PET film may be used.

Here, the flexible cover window may be laminated on an upper side of a flexible display panel in which a CPI film or PET film is attached to the front surface or on an upper side of a flexible display panel in which a CPI film or PET film is attached to the front surface, and an AF coated layer is formed on the upper layer of the CPI film or PET film. Preferably, a functional layer is formed on the front surface of the window substrate.

In addition, in the flexible cover window, it is preferable that a CPI film or a PET film is formed on the front surface of the window substrate, and a functional layer is preferably formed on the front surface of the CPI film or the PET film.

The present disclosure relates to a cover window for protecting a flexible display. The present disclosure provides a glass-based cover window for protecting a flexible display of a foldable, rollable, slidable, and stretchable method.

In particular, by forming an elastic buffer layer on a rear surface of a window substrate, the difference in elongation between a window substrate and a display panel is alleviated to prevent delamination or buckling in the folding part, thereby improving the lifespan of the cover window, and minimizing the screen distortion in the folding part.

In addition, the present disclosure minimizes limitations on the material, thickness, and hardness of the window substrate by forming an elastic buffer layer on the rear surface of the window substrate, so that window substrates of various materials can be used according to the folding method or product specification of the flexible display.

In addition, the present disclosure is implemented as a composite material of glass and resin material to reinforce the flexibility, resilience, elasticity, and strength characteristics of the resin material while maintaining the texture of the glass as much as possible.

DESCRIPTION OF THE PREFERRED EMBODIMENTS

The present disclosure relates to a cover window for protecting a flexible display and a glass-based cover window for protecting a flexible display of a foldable, rollable, slidable, and stretchable method.

In particular, the present disclosure improves the life of a cover window and minimizes distortion of the screen at the folding part by forming an elastic buffer layer on a rear surface of a window substrate to prevent delamination or buckling at a folding part due to micro-deformation due to a difference in elongation between a glass substrate and a display panel.

In addition, by forming an elastic buffer layer on the rear surface of the window substrate, restrictions on the material, thickness, and hardness of the window substrate may be minimized, and window substrates of various materials may be used according to the folding method or product specification of the flexible display.

In addition, by forming an elastic buffer layer on the rear surface of a window substrate, impact resistance is improved by absorbing and dispersing an impact force such as a pen drop, and a flexible cover window having the strength and folding characteristics ensured is provided.

Figure 1:
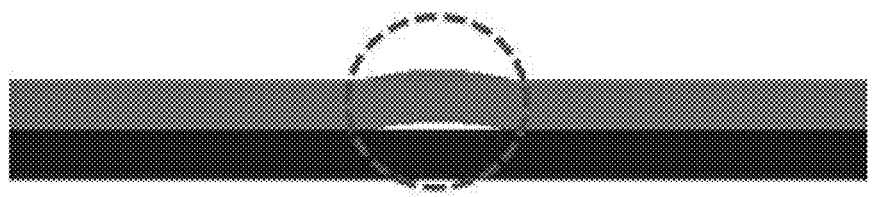
FIGS. 1 and 2 are schematic diagrams showing the lifting and buckling phenomenon in a folding part of the conventional flexible cover window.
Figure 2:
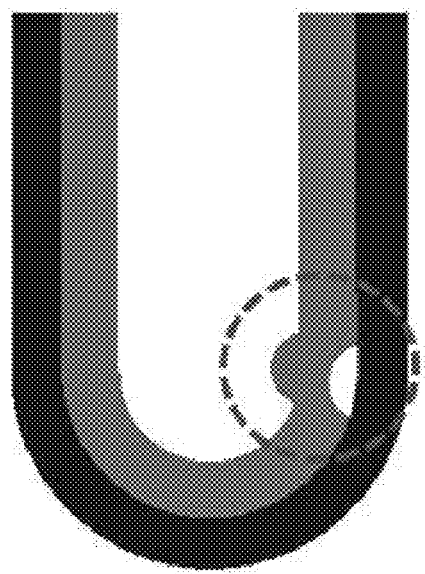
Figure 3:
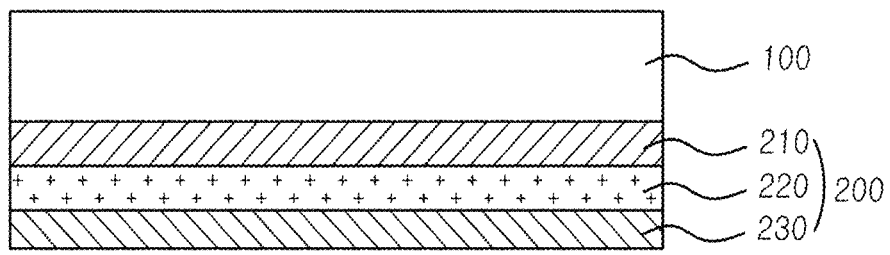
FIG. 3 is a schematic diagram of a flexible cover window according to an embodiment of the present disclosure.
Figure 4:
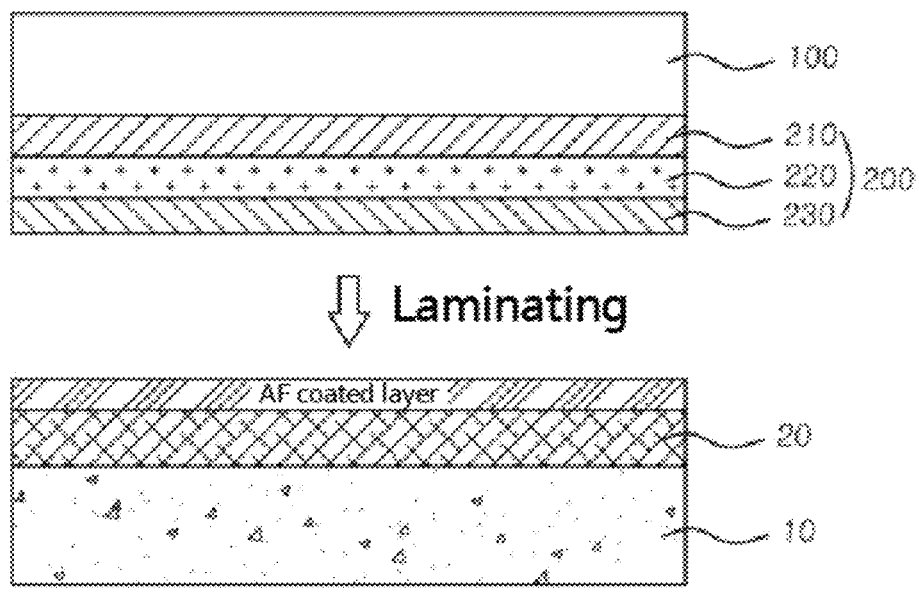
FIG. 4 is a schematic diagram showing an example of applying the embodiment of FIG. 3 to a flexible display panel.
Figure 5:
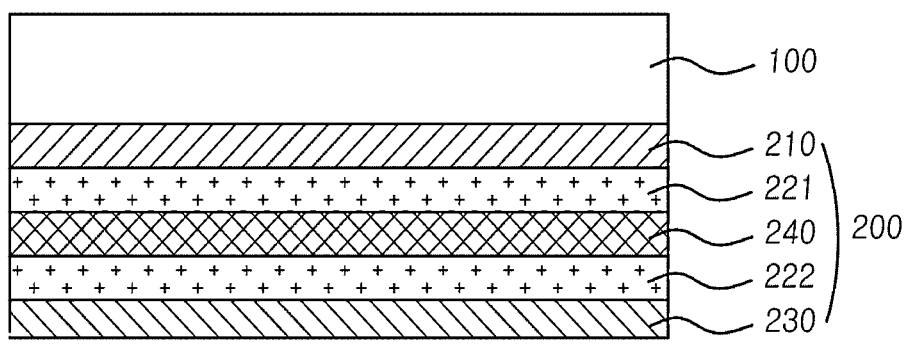
FIG. 5 is a schematic diagram of a flexible cover window according to another embodiment of the present disclosure.
Figure 6:
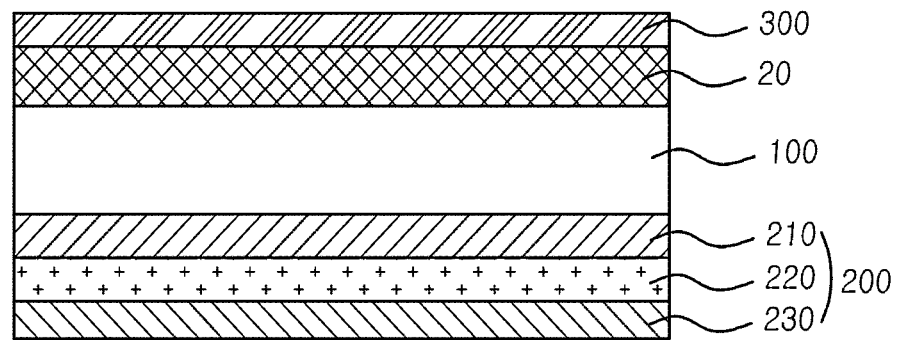
FIG. 6 is a schematic diagram of a flexible cover window according to another embodiment of the present disclosure.
Figure 7:
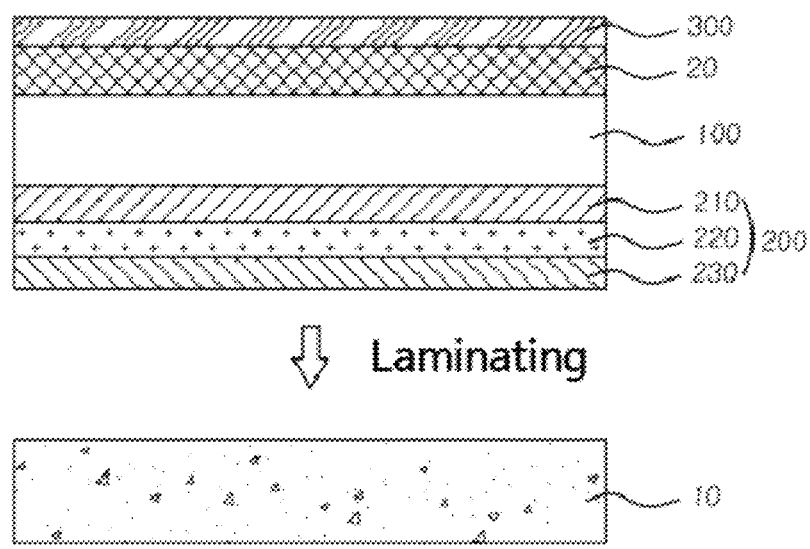
FIG. 7 is a schematic diagram showing an example of applying the embodiment of FIG. 6 to a flexible display panel.

Hereinafter, the present disclosure will be described in detail with reference to the accompanying drawings. FIG. 3 is a schematic diagram of a flexible cover window according to an embodiment of the present disclosure, FIG. 4 is a schematic diagram showing an example of applying the embodiment of FIG. 3 to a flexible display panel, FIG. 5 is a schematic diagram of a flexible cover window according to another embodiment of the present disclosure, FIG. 6 is a schematic diagram of a flexible cover window according to another embodiment of the present disclosure, and FIG. 7 is a schematic diagram showing an example of applying the embodiment of FIG. 6 to a flexible display panel.

As shown, a flexible cover window according to the present disclosure includes a window substrate 100 and an elastic buffer layer 200 formed on a rear surface of a window substrate 100 in a single structure or a multi-layer structure to absorb deformation generated by the folding part.

In the present disclosure, the term "front surface" refers to a surface that a user can touch, and refers to a surface that a touch pen or the like is in contact with, and refers to a surface facing upward in the drawing. Furthermore, the "rear surface" in the present disclosure refers to a surface opposite to the touch surface, that is, a surface in a direction toward the display panel, and refers to a surface in a downward direction in the drawing.

According to the present disclosure, a cover window is used for the protection of the flexible display panel 10 of a foldable, rollable, slidable, and stretchable method. It is laminated (attached) on the front surface of the flexible display panel 10.

The area of the cover window corresponding to the folded or rolled part of the flexible display panel 10 is referred to as a folding part, and an area other than the folding part is called a plane part.

As the window substrate 100 in the present disclosure, a polymer film or glass may be used. The thickness of the window substrate 100 is preferably 30 to 400 μm.

In the case of the polymer film, any transparent material may be used, and a thick polymer film of 40 μm or more or a hard plastic film may be applied. For example, a CPI film or a PET film may also be applied as the flexible cover window according to the present disclosure.

Previously, in order to be adopted as a cover window for various folding types (foldable, rollable, slidable, and stretchable), folding and hardness characteristics must be satisfied at the same time, so there was a limit to their application for thick or hard materials. As described above, a delaminating or buckling phenomenon occurred in the folding part, or the folding and strength characteristics deteriorated.

In the present disclosure, by forming an elastic buffer layer 200 on the rear surface of the window substrate 100, restrictions on the material, thickness, and hardness of the window substrate may be minimized, and window substrates of various materials may be used according to the folding method or product specification of the flexible display. Therefore restrictions on material selection can be minimized.

In the present disclosure, a glass substrate is used as an embodiment of the window substrate, and the following description will focus on this.

In one embodiment of the present disclosure, a glass substrate 100 may be formed to have a uniform thickness in all regions of the plane part, and the folding part or the folding part may be formed by slimming, which is thinner than the plane part. In this case, in general, the thickness of the plane part of the glass substrate 100 is 30 μm to 400 μm, and the thickness of the folding part is about 10 μm to 100 μm, and the folding part is formed by processing a very thin glass plate. The glass substrate 100 in the present disclosure reinforces strength by performing chemical reinforcement treatment.

The glass substrate in the present disclosure is formed on the front surface of the display panel 10 to protect the display panel 10 by maintaining folding and strength characteristics and can also be disposed on a clear polyimide (CPI) film cover to be used for protecting the CPI film.

As shown, the present disclosure includes a glass substrate 100 and an elastic buffer layer 200 formed on the rear surface of the glass substrate 100 in a single structure or a multi-layer structure to absorb deformation generated from the folding part.

In particular, the present disclosure improves the life of the cover window and minimizes distortion of the screen at the folding part by forming an elastic buffer layer 200 on the rear surface of the window substrate 100 to prevent delamination or buckling at the folding part due to micro-deformation due to a difference in elongation between the glass substrate 100 and the display panel 10.

In addition, by forming an elastic buffer layer 200 on the back surface of the glass substrate 100, impact resistance is improved by absorbing and dispersing an impact force such as a pen drop and a flexible cover window having the strength and folding characteristics ensured is provided.

Conventionally, cumbersome operations such as a masking process or an etching process have been performed to form a special pattern or folding part (F) on the glass substrate 100 in order to improve strength characteristics and folding characteristics. However, the process can be simplified without the cumbersome work described above by controlling the material, thickness, and physical properties of the elastic buffer layer 200 to disperse and absorb the impact force.

In general, when an impact such as a pen drop is applied on a cover window, the impact force transmitted vertically is stronger than the impact force transmitted horizontally. The elastic buffer layer 200, according to the present disclosure, is formed on the rear surface of the glass substrate 100 to disperse or absorb vertical impact force efficiently and serves to hold the glass substrate 100, thereby improving pen drop characteristics.

The elastic buffer layer 200 may be formed in a single or multi-layer structure according to the display or product specifications folding method.

FIG. 3 shows a case in which the elastic buffer layer 200 is formed in a single structure.

When the elastic buffer layer 200 is formed in a single structure, the elastic buffer layer 220 is sequentially formed as an upper adhesive layer 210, an elastic film layer 220 at a lower part of the upper adhesive layer 210, and a lower adhesive layer 230 at a lower part of the elastic film.

That is, adhesive layers are formed on both surfaces of the elastic film layer 220 to be laminated on the rear surface of the glass substrate 100 and attached to the front surface of the display panel 10 to alleviate a difference in elongation between the glass substrate 100 and the display panel 10, thereby preventing delamination or buckling at the folding part.

The upper adhesive layer 210 fixes the glass substrate 100 and the elastic film layer 220, the lower adhesive layer 230 fixes the display panel 10 and the elastic film layer 220, and the elastic film layer 220 serves to alleviate the difference in elongation between the flexible cover window and the display panel 10.

In the conventional method, when a cover window formed of a glass substrate 100 is laminated with an adhesive layer without an elastic buffer layer 200 structure, micro-deformation occurs due to a difference in elongation between an upper structure or a lower structure in the folding part, hence easily causing delamination or buckling in the folding part.

In the present disclosure, by forming an adhesive layer on both sides of the elastic film layer 220 to implement the elastic buffer layer 200 and laminating the elastic buffer layer between the glass substrate 100 and the display panel 10, the difference in elongation between the display panel 10 and the glass substrate 100 is alleviated, thereby eliminating delamination or buckling of the glass substrate 100 in the folding part.

As the elastic film layer 220, any material in the form of a transparent and elastic film may be used, and in an embodiment of the present disclosure, an elastic poly urethane (EPU) film, a thermoplastic polyurethane (TPU) film, and polyolefin (PO) film may be used.

According to an embodiment of the present disclosure, the thickness of the elastic film layer 220 is preferably 25 μm to 150 μm, more preferably 50 μm to 100 μm. When it is thinner than the above thickness range, the buffer function and the impact force absorption function of the elongation are insufficient. When it is thicker than the above thickness range, the thickness of the cover window may become thick, and the folding characteristics may be degraded.

The following table shows an example of the elastic properties of the elastic film layer 220 and is physical property data that can alleviate the difference in elongation between the thin glass substrate 100 and the display panel 10.

| Elastic physical properties | | |
|---|---|---|
| Item | Unit | Value |
| Thickness | μm | 50 to 100 |
| Young's Modulus | Mpa | 2.0 to 5.0 |
| Tensile strength | Mpa | 10 to 40 |
| Elongation at break | % | 300 to 800 |
| Recovery rate (100% stretch) | % | 85% or more |
| Haze | % | less than 3.0 |
| Transmittance | % | 85% or more |

In addition, the surface of the elastic film layer 220 is subjected to plasma surface treatment or the like to improve the wettability of the surface of the elastic film layer 220, thereby improving the coating property of the adhesive layer on the surface of the elastic film layer 220 and enabling uniform and precise coating.

For the upper adhesive layer and the lower adhesive layer in the present disclosure, optical clear adhesion (OCA) or optical clear resin (OCR) may be used, which is a transparent resin almost equal to the refractive index of glass 1.5, and for example, acrylic, epoxy, silicone, urethane, urethane composite, urethane acrylic composite, hybrid sol-gel, siloxane composite, and the like may be used.

The thickness of the upper and lower adhesive layers is preferably 10 μm to 150 μm, the thickness of the upper adhesive layer 210 is more preferably 25 μm to 75 μm, and the thickness of the lower adhesive layer 230 is more preferably 10 μm to 50 μm.

If it is thinner than the above thickness, the fixing effect for adhesion is degraded, and if it is thicker than the above thickness, the folding characteristics and transparency will be degraded, or the adhesive force will be wasted without improving.

As shown in FIG. 4, the flexible cover window may be laminated on an upper side of the flexible display panel 10 in which the existing CPI film or PET film 20 is attached to the front side, or may be laminated on the flexible display panel 10 in which a CPI film or PET film 20 is attached to the front surface, and an AF coating layer is formed on the upper layer thereof.

In this case, a functional layer may be formed on the front surface of the glass substrate 100. The functional layer may reinforce the scattering prevention function of the glass substrate 100 and the surface scratch resistance (3H), etc., and the thickness thereof is suitably about 2 μm to 20 μm.

A transparent resin such as optical clear resin (OCR), almost the same as the refractive index of glass (1.5), may be used as the functional layer, and for example, acrylic, epoxy, silicone, urethane, urethane composite, urethane acrylic composite, hybrid sol-gel, and siloxane, etc. may be used.

In addition, The functional layer may be implemented by providing an anti-finger (AF) function or an anti-reflective (AR) function, synthesizing a resin having such a function, or forming various patterns, for example, a pattern such as a moth-eye.

In another embodiment of the present disclosure, as shown in FIG. 5, when the elastic buffer layer 200 is formed in a multi-layered structure, an upper adhesive layer 210 is formed in the upper part of the elastic buffer layer 200, a plurality of elastic film layers 221, 222 are formed in a laminated structure through an intermediate adhesive layer 240 under the upper adhesive layer 210, and the lower adhesive layer 230 is formed in the lower part of the elastic film layers laminated structure.

When the elastic buffer layer 200 is formed in a multilayer structure, the plurality of elastic film layers may be formed of the same material, the same hardness, and the same thickness. The plurality of elastic film layers may be formed to have a lower elongation (elasticity) as they are closer to the glass substrate (in-folding) according to a folding method or a product specification of the display, or may have a higher elongation (elasticity) as they are closer to the glass substrate (out-folding).

Accordingly, a laminated structure consisting of the same or different elastic film layers is implemented according to various folding methods of the display, thereby alleviating a difference in elongation in the folding part and minimizing defects such as delamination or buckling in the folding part.

In the present disclosure, as shown in FIG. 6, a CPI film or a PET film 20 may be formed on the front surface of the glass substrate 100, and a functional layer 300 may be formed on the front surface of the CPI film or a PET film 20.

In this case, as shown in FIG. 7, the protective CPI film or PET film 20 formed on the front surface of the conventional flexible display panel 10 is omitted, and the CPI film or PET film 20 is formed on the front surface of the glass substrate 100 and, thereafter, the functional layer may be formed as needed.

According to the present disclosure, the cover window is directly laminated on the flexible display panel 10. The CPI film or PET film 20 is formed thereon, and then the functional layer 300 is formed as necessary.

As such, the present disclosure relates to a cover window for protecting a flexible display and providing a cover window for protecting a flexible display of a foldable, rollable, slidable, stretchable method.

In particular, by forming an elastic buffer layer on the rear surface of the window substrate, the difference in elongation between the window substrate and the display panel is alleviated to prevent delamination or buckling in the folding part, thereby improving the lifespan of the cover window, improving the lifespan of the cover window, and minimizing the screen distortion in the folding part.

In addition, by forming an elastic buffer layer on the rear surface of a window substrate, impact resistance is improved by absorbing and dispersing an impact force such as a pen drop. A flexible cover window having the strength and folding characteristics ensured is provided.

In addition, the present disclosure minimizes limitations on the material, thickness, and hardness of the window substrate by forming an elastic buffer layer on the rear surface of the window substrate, so that window substrates of various materials may be used according to the folding method or product specification of the flexible display. Therefore restrictions on material selection can be minimized.

In addition, in an embodiment of the present disclosure, when a window substrate is used as glass, the present disclosure is implemented as a composite material of glass and resin material to reinforce the flexibility, resilience, elasticity, and strength characteristics of the resin material while maintaining the texture of the glass as much as possible.

What is claimed is:

1. A flexible cover window comprising:
a window substrate; and
an elastic buffer layer provided on a rear surface of the window substrate, the elastic buffer layer functioning absorb deformation occurring in a folding part,
wherein the elastic buffer layer comprises configuration (A) or (B) as follows:
(A) an upper adhesive layer, an elastic film layer disposed under the upper adhesive layer, and a lower adhesive layer disposed under the elastic film layer; or
(B) an upper adhesive layer above a laminate; said laminate comprising a first elastic film layer above an intermediate adhesive layer, and a second elastic film layer below the intermediate adhesive layer; and a lower adhesive layer disposed below the laminate,
wherein the elastic film layers of configurations (A) and (B) have a Young's modulus of 2.0 to 5.0 MPa.

2. The flexible cover window of claim 1, wherein the elastic buffer layer
comprises configuration (A).

3. The flexible cover window of claim 2, wherein the elastic film layer of configuration (A) is selected from the group consisting of an elastic poly-urethane (EPU) film, a thermoplastic polyurethane (TPU) film, and a polyolefin (PO) film.

4. The flexible cover window of claim 2, wherein in configuration (A), the adhesive layers are individually selected from an optically clear adhesive (OCA) or an optical clear resin (OCR).

5. The flexible cover window of claim 2, wherein in configuration (A), the elastic film layer has a thickness of 25 μm to 150 μm.

6. The flexible cover window of claim 2, wherein in configuration (A), the upper adhesive layer and the lower adhesive layer individually have a thickness of 10 μm to 150 μm.

7. The flexible cover window of claim 1, wherein the elastic buffer layer
comprises configuration (B).

8. The flexible cover window of claim 7, wherein the elastic film layers of configuration (B) are individually selected from the group consisting of an elastic polyurethane (EPU) film, a thermoplastic polyurethane (TPU) film, and a polyolefin (PO) film.

9. The flexible cover window of claim 7, wherein in configuration (B), the adhesive layers are individually selected from an optically clear adhesive (OCA) or an optical clear resin (OCR).

10. The flexible cover window of claim 7, wherein in configuration (B), the elastic film layers individually have a thickness of 25 μm to 150 μm.

11. The flexible cover window of claim 7, wherein in configuration (B), the adhesive layers individually have a thickness of 10 μm to 150 μm.

12. The flexible cover window of claim 1, wherein the window substrate is made of a polymer film or glass.

13. The flexible cover window of claim 12, wherein the window substrate has a thickness of 30 μm to 400 μm.

14. The flexible cover window of claim 12, wherein the polymer film is a CPI film or a PET film.

15. The flexible cover window of claim 1, wherein the flexible cover window is applied on an upper surface of a flexible display panel in which a CPI film or a PET film is attached to a front surface thereof or on an upper surface of a flexible display panel in which a CPI film or a PET film is attached to the front surface thereof and an anti-fingerprint (AF) coating layer is provided on the upper surface of the CPI film or PET film.

16. The flexible cover window of claim 15, further comprising a functional layer on the front surface thereof.

17. The flexible cover window of claim 1, further comprising a CPI film or a PET film on the front surface thereof.

18. The flexible cover window of claim 17, further comprising a functional layer provided on the front surface of the CPI film or the PET film.

\* \* \* \* \*